UNITED STATES PATENT OFFICE.

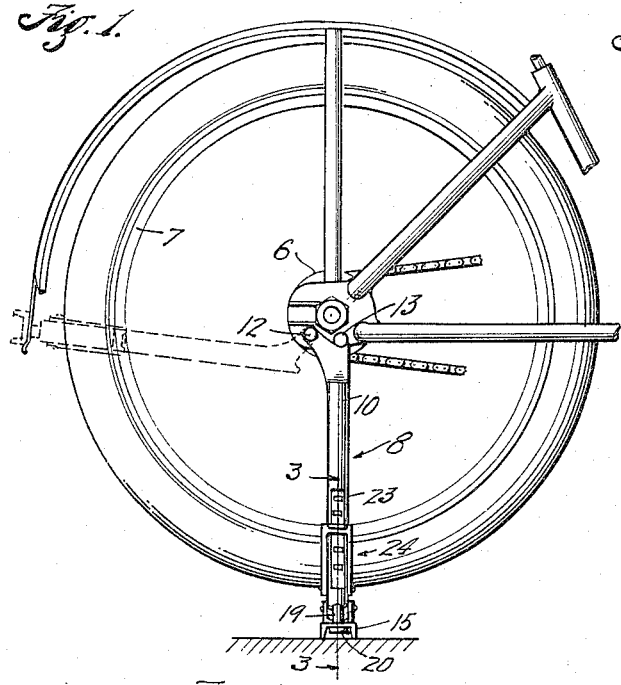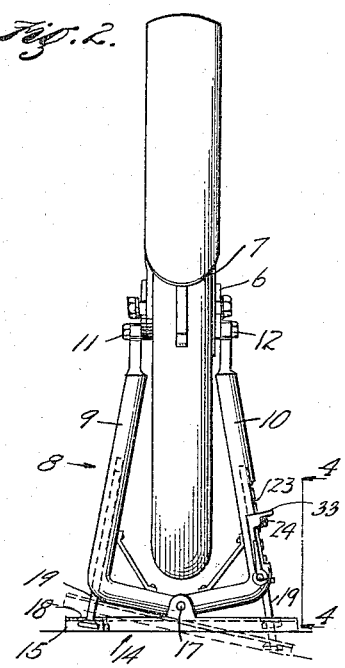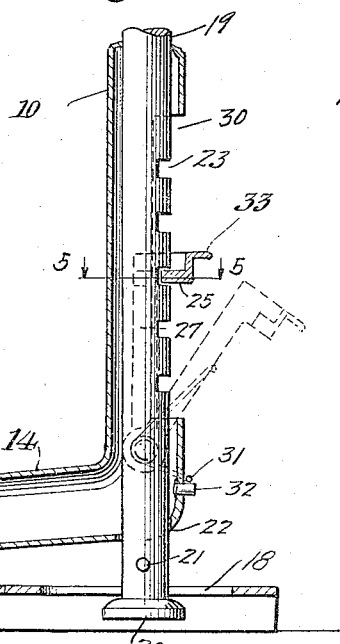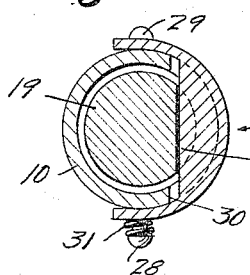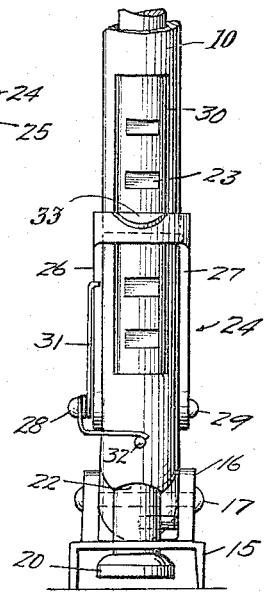

HERBERT VERMEER, OF LOS ANGELES, CALIFORNIA.

STAND FOR MOTOR-CYCLES.

1,156,567.     Specification of Letters Patent.     Patented Oct. 12, 1915.

Application filed June 15, 1914. Serial No. 845,071.

*To all whom it may concern:*

Be it known that I, HERBERT VERMEER, a citizen of the United States, residing at Los Angeles, in the county of Los Angeles, State of California, have invented new and useful Improvements in Stands for Motor-Cycles, of which the following is a specification.

This invention relates to a stand for motorcycles.

It is the object of this invention to provide a stand for motorcycles of the type that are pivoted to the rear frame thereof and adapted to be disposed to support the rear wheel of the cycle clear of the ground and which can be swung to an inoperative position when the cycle is in use, and the particular object of this invention is to provide a stand of this character which is adjustable so that its base may be set to conform to the inclination of a surface on which it is supported. In the ordinary motorcycle stands no such adjustment is provided, thus necessitating the disposing of the motorcycle in an inclined position when the stand is disposed on an inclined surface, which is objectionable in that the motorcycle is liable to upset.

In my present invention I have overcome the above difficulty by providing an adjustable base for the motorcycle stand which can be set at various inclinations in either direction in relation to the stand so that when it rests on an inclined surface the stand and the motorcycle will be supported in a vertical position.

The invention is illustrated in the accompanying drawing, in which:

Figure 1 is a side elevation of the rear portion of a motorcycle, showing the invention as applied. Fig. 2 is an end view of same illustrating the stand as disposed in a normal position in full lines, and as adjusted to conform to an inclined surface in dotted lines. Fig. 3 is an enlarged detail section on the line 3—3 of Fig. 1 as seen in the direction indicated by the arrows, and showing the construction whereby the stand base is adjusted and retained in its several positions. Fig. 4 is an enlarged detail side elevation of the lower portion of the frame as seen on the line 4—4 of Fig. 2 in the direction indicated by the arrows. Fig. 5 is an enlarged detail horizontal section on the line 5—5 of Fig. 3.

More specifically, 6 indicates the rear portion of the frame of a motorcycle which may be of any suitable construction and on which the motorcycle wheel 7 is mounted in the ordinary manner.

The present invention resides in the construction of the motorcycle stand which comprises a substantially U-shaped member 8, the upwardly extending members 9 and 10 of which are formed with rearwardly projecting portions which are pivotally connected to the frame 6 by means of pivot pins 11 and 12.

The upper ends of the members 9 and 10 are adapted to abut against lugs or projections 13 on the frame 6 when the members 9 and 10 are disposed in a vertical position, as shown in Fig. 1, to form a support for the frame 6, as is common in motorcycle stand construction. The members 9 and 10 are formed integral with the connecting member 14 of the stand and are preferably made of tubing bent to the desired shape.

Pivoted centrally of the connecting member 14 is a base plate 15, here shown as constructed of channel iron and having a pair of ears 16 formed on its upper face mediate its ends which project on opposite sides of the member 14 and are pivotally connected thereto by the pivot pin 17. Formed in the upper face of the base plate 15 adjacent each end thereof is a longitudinally extending slot 18 through which a rod 19 extends; the lower end of each rod being engaged with the plate 15 by means of a head 20 on its lower end on one side of the plate and a pin 21 on the rod on the opposite side of the plate, as shown in Fig. 3.

The upper portions of the rods 19 extend through openings 22 in the stand 8 formed at the juncture of the members 9 and 10 with the members 14 and project upwardly in the interiors of the members 9 and 10 a suitable distance. Formed in the outer face of the rod 19 extending into the member 10 is a series of square notches 23 spaced suitable distances apart and which notches are adapted to be engaged by a latch 24 comprising a cross member 25 substantially rectangular in cross section carried at its ends on outwardly extending arms 26 and 27 which project on opposite sides of the member 10 and are pivotally connected thereto adjacent the juncture of the members 10 and 14 by means of pivot pins 28 and 29.

The outer face of the member 10 is formed with a longitudinally extending slot 30 which is cut to a depth in the sides of the member 10 sufficient to permit the member 25 on the catch 24 to extend into and engage the notches 23. This catch is normally maintained in its innermost notch engaging position by means of a spring 31 which is wound on a pivot pin 28 and has one end bent to engage the outer face of the arm 26 and has its opposite end engaged by a pin 32 carried on the member 10. This spring being so tensioned as to exert a pressure on the arm 26 normally maintaining the latch in its innermost position.

When the member 25 is engaged with the notch 23 a base member 15 is securely held against pivotal movement on its pivot 17. Normally, the latch member 25 is engaged with such notch 23 as will position the base plate 15 in a horizontal position so that when the stand is disposed in its operative position, as shown in Figs. 1 and 2, the base plate 15 will extend on a horizontal plane.

In the operation of the invention, when it is desired to adjust the base plate 15 so that it will conform to an inclined surface the latch 24 is manually moved downwardly in opposition to the spring 31 by pressing against a finger piece 33 formed on the latch member 25 into the position indicated in dotted lines in Fig. 3, whereupon the base plate 15 on coming into contact with the supporting surface will automatically adjust itself to the inclination of such surface so as to tilt the plate at an inclination in either direction, whereupon the catch 24 is released so as to cause the member 25 to engage one of the notches 23 thereby locking the base plate 15 against pivotal movement and holding it in its inclined position such as indicated in dotted lines in Fig. 2.

The rod 19 adapted to be engaged by the catch 24 has a slight longitudinal movement in relation to the plate 15 so that its head portion 22 may be moved into engagement with the supporting surface and be engaged therewith so as to prevent slipping of the base member.

What I claim is:

1. In a motorcycle stand, the combination with a supporting frame pivoted to a motorcycle frame, of a base plate pivotally connected to said supporting frame, and means for locking said base plate at various inclinations in relation to the supporting frame.

2. A motorcycle stand, comprising a U-shaped member pivotally connected to the motorcycle frame, a base plate pivotally mounted on the connecting portion of the U-shaped frame, a latch, and means connecting with said base and coöperating with said latch for locking the base plate at various inclinations in relation to the U-shaped frame.

3. In a motorcycle stand, a tubular U-shaped frame, a base plate pivotally connected to the connecting portion of said frame, a rod engaging the base plate and projecting into one of the tubular side members of the frame and formed with a series of notches, and a spring pressed latch mounted on the side member of the frame and adapted to extend through a longitudinal slot on said frame into engagement with the notches on the rod to lock the latter and the base plate against movement in adjusted positions.

4. In a motorcycle stand, a U-shaped member adapted to be connected to the motorcycle frame, a channel-iron base plate pivotally connected to the connecting portion of the U-shaped member having a slot adjacent one end thereof, a rod extending through said slot and having a head on its end on the underside of the base plate, said rod having a series of notches formed thereon, and means on the U-shaped member engageable with said notches for holding the base-plate at various inclinations.

5. A support of the character described comprising a member pivotally attached to the rear of a motor cycle frame, a tread bar pivotally attached to the lower end of the said member, rods pivotally attached to the outer ends of the tread bar and telescoping within the said member, and means for holding the said rods in their adjusted position within said member.

6. A support of the character described comprising a member pivotally attached to the rear of the frame of a motor cycle, a tread bar adjustably pivoted to the lower end of said member, and means for holding the tread bar in its adjusted position.

7. In a motor cycle stand, a tubular U-shaped frame, a base plate pivotally connected to the connecting portion of said frame, a rod engaging the base plate and projecting into one of the tubular side members of the frame and formed with a series of notches, and means mounted on the side member of the frame and adapted to extend through a slot in said frame into engagement with the notches on the rod to lock the latter and the base plate against movement in adjusted positions.

In witness that I claim the foregoing I have hereunto subscribed my name this 23rd day of May, 1914.

HERBERT VERMEER.

Witnesses:
MARGUERITE BATES,
MARIE BATTEY.